J. A. EDEN, Jr.
MULTIPLE DRILL.
APPLICATION FILED JAN. 29, 1914.

1,121,992.

Patented Dec. 22, 1914.

WITNESSES

INVENTOR
James A. Eden, Jr.
BY
ATTORNEY

UNITED STATES PATENT OFFICE.

JAMES A. EDEN, JR., OF SPRINGFIELD, MASSACHUSETTS, ASSIGNOR TO BAUSH MACHINE TOOL COMPANY, A CORPORATION OF MASSACHUSETTS.

MULTIPLE DRILL.

1,121,992.	Specification of Letters Patent.	Patented Dec. 22, 1914.

Application filed January 29, 1914. Serial No. 815,124.

*To all whom it may concern:*

Be it known that I, JAMES A. EDEN, Jr., a citizen of the United States, residing in Springfield, Massachusetts, have invented certain new and useful Improvements in Multiple Drills, of which the following is a specification.

In this class of machines flexible spindles are used for driving the drills, each spindle being provided with two bearings, the bearings nearest to the drills being laterally adjustable so as to secure the desired spacing of the drills. The arm or equivalent member which carries the adjustable bearing is in some positions of adjustment supported at a point so remote from the bearing that the reactionary thrust on the latter tends to bend the arm.

The present invention provides a simple and easily applied or adjusted means for bracing or staying the arms against such thrust.

The accompanying drawings illustrate embodiments of the invention.

Figure 1:
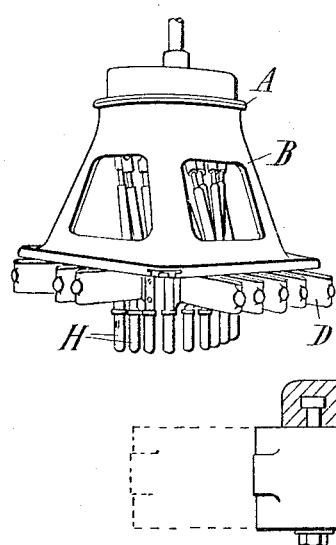
Figure 2:
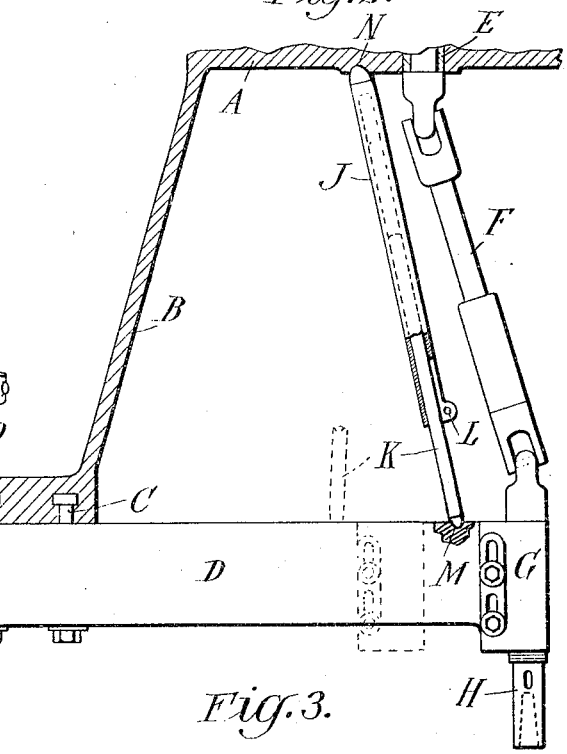
Figures 4, 5:
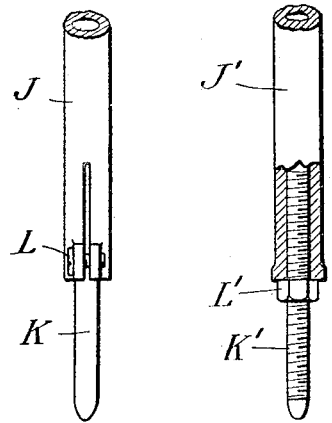
Figure 3:
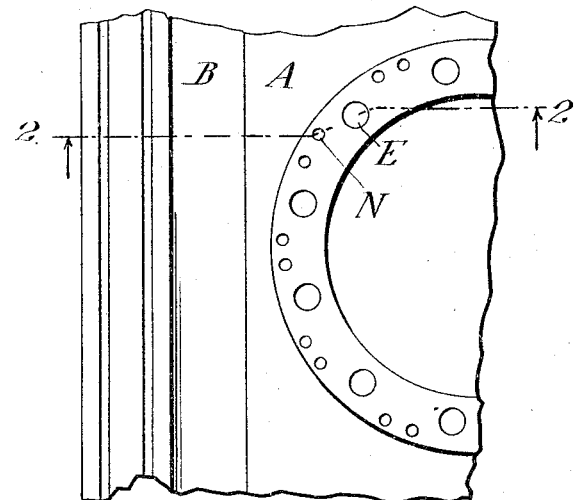

Figure 1 is a view of the head of a multiple drill machine of standard type; Fig. 2 is a vertical section thereof on the line 2—2 of Fig. 3; Fig. 3 is an underside plan view of the head of the machine on a smaller scale than Fig. 2; Fig. 4 is a side elevation of the lower part of the strut shown in Fig. 2; Fig. 5 is a sectional view of a modified style of strut.

Referring now to the embodiments of the invention illustrated the machine is provided with a head A having a flange B, the edge of which is provided with grooves carrying fastening bolts C which pass through slots in arms D so that the latter can be adjusted laterally (to the position indicated in dotted lines in Fig. 2, for example) and angularly. In the head A is a number of bearings E for the flexible spindles F, and the inner end of each arm D carries a bearing G for the opposite end of a flexible spindle, each spindle terminating in a socket H which carries a drill. This is a well known construction.

For supporting the movable bearing G against the backward thrust I provide a strut consisting of two parts J and K adjustable relatively to each other. In the construction shown in Fig. 2 the member J is provided with a split end in which is a clamping nut L, see Fig. 4. In the form shown in Fig. 5 the member K' telescopes or screws into the member J' and is held in the desired adjustment by the nut L'. The members J and K of the strut are rounded at their outer ends. Each of the arms has a depression or recess M formed in its upper edge directly back of the bearing G. The head A is provided with a series of such depressions or recesses N cast or machined at convenient points adjacent to the bearings E, so that when the brace is used the position of its upper end can be at one side or another of the bearing according to the angle at which the arm is set. These recesses engage the rounded ends of the strut so as to permit angular adjustment of the latter to various positions; and the adjustment of the length of the strut accommodates it to various lateral positions of the arm.

The strut is of especial utility when the arm D is in an extended position of adjustment so that the bearing G is at a point remote from the point of support of the arm. Such positions often occur especially with irregular layouts of the drills in which case it is impossible to get a proper support for the arm without increasing the weight of the head flange and the size of the bolts to an impractical extent. The present invention supports the arm in such positions of extreme adjustment without the necessity of extra heavy head flange and bolts, and in fact permits the making of these fastenings lighter than customary, if that should be desired.

Though I have described with great particularity of detail certain specific embodiments of my invention yet it is not to be understood therefrom that the invention is restricted to the particular embodiments disclosed. Various modifications thereof in detail and in the arrangement and combination of the parts may be made by those skilled in the art without departure from the invention, as defined in the following claims.

What I claim is—

1. A multiple drill machine including in combination a head having bearings for drill spindles, arms also having bearings for such spindles, means for supporting said arms in different positions of adjustment relatively to said head, flexible drill spindles mounted in said bearings, and means for bracing said arms at points between their points of support and their spindle bearings in different positions of adjustment.

2. A drilling machine having a pair of bearings, a flexible drill spindle mounted in said bearings, means for supporting one of said bearings in different positions of adjustment relatively to the other and additional means for bracing said adjustably supported bearing in different positions of its adjustment.

3. A drilling machine having a pair of bearings, a flexible drill spindle mounted in said bearings, means for supporting one of said bearings in different positions of adjustment relatively to the other and a strut of adjustable length for bracing said bearings apart in different positions of adjustment.

4. A multiple drill machine including in combination a head having bearings for drill spindles, arms also having bearings for such spindles, means for supporting said arms in different positions of adjustment relatively to said head, flexible drill spindles mounted in said bearings, and struts of adjustable length extending between said head and said arms for bracing the latter in different positions of adjustment.

5. A multiple drill machine including in combination a head having bearings for drill spindles, arms also having bearings for such spindles, means for supporting said arms in different positions of adjustment relatively to said head, flexible drill spindles mounted in said bearings, and struts of adjustable length extending between said head and said arms for bracing the latter in different positions of adjustment, said struts having round ends engaging recesses in said head and said arms respectively to permit relative angular movement.

6. A multiple drill machine including in combination a head having bearings for drill spindles, arms also having bearings for such spindles, said head having a flange and said arms being adjustably supported from said flange, flexible drill spindles mounted in said bearings and struts between said head and the inner portions of said arms and adapted to brace the latter in different positions of adjustment.

In witness whereof, I have hereunto signed my name in the presence of two subscribing witnesses.

JAMES A. EDEN, Jr.

Witnesses:
DAVID McCOMBE,
GEO. V. CURTIS.

Copies of this patent may be obtained for five cents each, by addressing the "Commissioner of Patents, Washington, D. C."